Feb. 4, 1930.                S. D. LIVINGSTON                1,745,856
                              ELECTRIC THERMOSTAT
                              Filed June 17, 1927
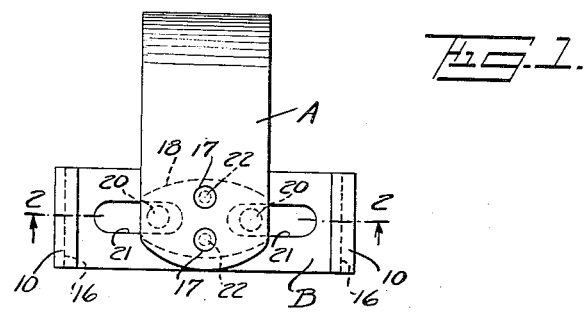
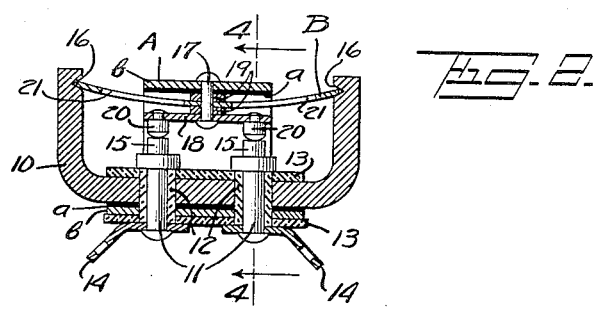
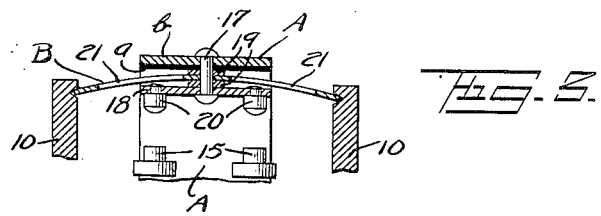
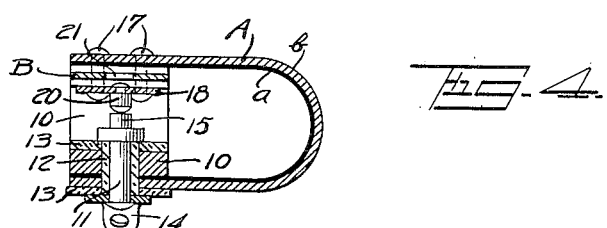
INVENTOR
Stanley D. Livingston
BY
Adolph A. Thomas
ATTORNEY Patented Feb. 4, 1930

1,745,856

UNITED STATES PATENT OFFICE

STANLEY D. LIVINGSTON, OF FREEPORT, NEW YORK, ASSIGNOR TO ADOLPH A. THOMAS, OF NEW YORK, N. Y.

ELECTRIC THERMOSTAT

Application filed June 17, 1927. Serial No. 199,446.

My invention is for a quick-acting thermostat of simple construction and positive operation in abruptly breaking and closing an electric circuit at predetermined temperature limits without arcing at the contacts. The circuit may be interrupted at two points in series, so that the instrument is particularly adapted to control circuits of high wattage, as in certain types of electric heating devices.

The thermostat of my invention comprises a buckling spring carrying a pair of resiliently mounted contacts which normally engage a pair of fixed insulated contacts to close an electric circuit. A thermostat bar is so connected to the spring as to snap the same into reverse curvature at predetermined high and low temperatures. That is to say, the spring resists the thermostatic movements of the bar until certain temperature limits are reached, whereupon the pressure exerted by the bar on the spring overcomes the latter and suddenly throws it into a position of opposite curvature. The circuit remains positively closed until the sudden buckling of the spring by the thermostat bar, due to the fact that the resiliently mounted contacts stay in engagement with the fixed contacts during the slight preliminary movements of the spring preceding the buckling action. At the moment of buckling, the circuit is abruptly broken at two points in series, and the resilient contacts that move with the spring separate from the fixed contacts in gaps of considerable length. This makes arcing and burning of the contacts impossible.

In a preferred form of my invention, I employ a U-shaped thermostat bar mounted at one end on a small U-shaped bracket, which also carries the buckling spring and the fixed insulated contacts. This produces an instrument of unusual simplicity and rugged construction, reliable in operation and easy to calibrate.

So that those who are skilled in this art may fully understand my invention and practise the same, I shall describe in detail an embodiment thereof as shown in the accompanying drawings, in which—

Fig. 1 is a plan view of a thermostat constructed in accordance with my invention;

Fig. 2 is a transverse cross-section on line 2—2 of Fig. 1, the parts being shown in normal circuit-closing position;

Fig. 3 is a view similar to Fig. 2 (partly broken away) showing the parts in actuated position to break the circuit;

Fig. 4 represents a cross-section approximately on line 4—4 of Fig. 2.

The operative parts of the instrument are mounted on a U-shaped bracket 10, which may be made of metal or of strong insulating material. A U-shaped thermostat bar A is mounted at one end on bracket 10. This bar is of usual bimetallic construction, consisting of a brass strip $a$ and an iron strip $b$, or equivalent metals having different coefficients of expansion. Bolts 11 or equivalent fastening members secure the thermostat bar rigidly to the base of bracket 10. These bolts are insulated by sleeves 12 and sheets 13 of insulating material, or in any other practical way. The sheets 13 are preferably mica, which is able to withstand high heat and considerable mechanical pressure. Connecting pieces 14 are attached to bolts 11 for receiving circuit conductors. The insulated bolts 11 terminate in contact heads 15, which may be formed integral with the bolts or separately attached thereto. In this way, the members 11 serve the double purpose of securing the thermostat bar A to the supporting frame 10, and at the same time acting as insulated switch terminals through which the circuit is closed in series.

The supporting frame 10 is provided at its upper end with notches or angular grooves 16 adapted to receive the ends of a buckling spring B, which is secured at the center to the free end of thermostat bar A by a pair of bolts or rivets 17 arranged transversely of the spring. The bolts or rivets 17 also serve to support a spring plate 18. Washers 19 hold the spring B properly spaced from plate 18 and the thermostat bar. A pair of contacts 20 are mounted on the resilient plate 18 and arranged to engage the fixed contacts 15 when the parts are in normal position, as illustrated in Fig. 2. The resiliency of spring plate 18 holds the contacts 20 in firm pressure engagement with terminals 15.

At ordinary temperature, the thermostat bar A and buckling spring B are in the position shown in Fig. 2, and the electric circuit is closed in series through the connecting bolts 11, contacts 15 and 20, and plate 18. As the temperature of the thermostat bar A increases, the free end of the bar tends to move upwardly, but this movement is resisted by the inherent tension of spring B until the temperature has risen to a point where the internal stresses at the free end of bar A overcome the opposition of spring B. At that moment the spring is snapped into reverse curvature, while at the same time the connected end of bar A moves upwardly with the spring. The quick upward movement of bar A and spring B carries the contacts 20 out of sudden engagement with the insulated contacts 15, so that the circuit is abruptly broken at two points in series. This prevents arcing or burning of the contacts at the moment of break. Fig. 3 shows the parts in circuit-breaking position, and it will be seen that the contacts 20 are separated through a wide gap from contacts 15. In practice, each gap thus formed may be as much as one-eighth of an inch, so that the two gaps in series constitute an effective opening of one-fourth of an inch. I might explain here that the original drawings show the instrument twice the actual size.

As the thermostat bar A begins to cool after the circuit has been opened, it wants to move back to original position and thus exerts a downward pressure at the center of the buckling spring B. This tendency of the bar to move down at its free end is resisted by the spring until the increasing downward pressure exerted by the cooling thermostat bar overcomes the opposition of the spring, whereupon the latter is snapped back to initial circuit-closing position, as shown in Fig. 2. At the end of this circuit-closing movement, the resiliently mounted contacts 20 are jammed down tight against the fixed insulated contacts 15.

Attention is called to the fact that the circuit is not broken until the actual moment of buckling of spring B. Whatever preliminary movements may occur at the free end of the thermostat bar A before the spring snaps, such slight movements do not separate the movable contacts 20 from the fixed contacts 15. This is due to the fact that the resilient mounting 18 of contacts 20 is able to follow the slight movements of bar A and spring B before the moment of buckling without separating contacts 20 from contacts 15. Likewise, whatever slight movements of bar A and spring B may take place after the spring has been snapped back into circuit-closing position, the contacts 15 and 20 remain in engagement until the spring is buckled by the thermostat bar at predetermined high temperature.

It will be noticed in the drawings that the buckling spring B is provided with a pair of longitudinal slots 21. The purpose of these slots is to compensate for the holes 22 through which the rivets 17 pass. The slots 21 equalize (or tend to equalize) the stresses produced in spring B by the pressure of thermostat bar A, so that the spring can properly buckle without danger of breaking across the center.

It will be apparent from the preceding description that I have provided a thermostat construction of great simplicity and ruggedness. All the parts are mounted on a single bracket, and the instrument is easily installed in small electric heating appliances, such as flat-irons and the like, where overheating is to be prevented. The thermostat bar A and buckling spring B are readily calibrated, so that all instruments of the same type will break the circuit at a predetermined high temperature, or as near thereto as practical conditions permit. It is evident that, instead of breaking the circuit at two points in series, I may use only one contact 15 and one contact 20, but I prefer two pairs of contacts for the reasons stated.

Although I have shown and described a specific structure, I want it understood that I am not limited to any structural details or their equivalents unless directly included in the claims. When in the description and claims I speak of the thermostat bar being connected to the center of the buckling spring, I do not mean the exact mathematical center of the spring, but I mean at or near the center.

I claim as my invention:

1. An electric thermostat comprising a supporting frame, a buckling spring mounted on said frame and adapted to reverse its curvature suddenly by external pressure, a thermostat bar supported at one end and rigidly secured at the other end to the center of said spring for snapping the same into reverse curvature under the action of temperature variations, said spring preventing thermostatic movement of said bar until predetermined high and low temperature limits are reached, stationary contact means carried by said frame, a resilient member attached to said spring and movable therewith, and contact means carried by said resilient member and normally engaging said stationary contact means to close an electric circuit, which remains closed until the thermostat bar at predetermined high temperature snaps the spring into reverse curvature, whereupon said resiliently mounted contact means separate abruptly from the stationary contact means, said movable contact means snapping back to circuit-closing position when the cooling thermostat bar buckles the spring to initial position.

2. An electric thermostat comprising a supporting frame, a buckling spring mounted on said frame and adapted to reverse its curvature suddenly by external pressure, a thermostat bar rigidly secured to the center of said spring for snapping the same into reverse curvature under the action of temperature variations, said spring preventing thermostatic movement of said bar until predetermined high and low temperature limits are reached, a pair of insulated stationary contacts carried by said frame and adapted to be connected in circuit, a resilient mounting attached to said spring, and a pair of contacts carried by said mounting and normally engaging said stationary contacts to close the circuit in series through said contacts and said mounting, said movable contacts remaining in circuit-closing position until the thermostat bar snaps the spring into reverse curvature, whereupon the circuit is abruptly broken at two points in series, the buckling of said spring by the cooling thermostat bar abruptly closing the circuit.

3. As a new article of manufacture for use in thermostats, a buckling spring provided with a pair of transversely arranged holes at the center and having longitudinal slots on opposite sides of said holes, substantially as and for the purposes specified.

4. In an electric thermostat, a buckling spring supported at its ends and adapted to snap into reverse curvature by external pressure, a resilient plate secured to the center of said spring and carrying a plurality of contacts, a corresponding plurality of fixed contacts adapted to be connected in an electric circuit, said spring being normally in such position that the resiliently mounted contacts engage said fixed contacts to close the circuit, and thermostatic means rigidly connected to said spring for snapping the same into reverse curvature under predetermined changes of temperature, said resiliently mounted contacts remaining in engagement with said fixed contacts until the spring is snapped into reverse curvature at predetermined high temperature, whereupon the circuit is abruptly opened at a plurality of points in series, the buckling of said spring by said thermostatic means at predetermined low temperature abruptly closing the circuit, said buckling spring being adapted to prevent movement of said thermostatic means until certain high and low temperature limits are reached.

5. An electric thermostat comprising a U-shaped supporting bracket, a buckling spring mounted at its ends on the arms of said bracket, a U-shaped thermostat bar secured at one end to the base of said bracket and extending in a direction substantially at right angles to the bracket, means for rigidly connecting the free end of said bar to the center of said spring, so that the movements of said bar under predetermined changes of temperature snap said spring into reverse curvature, an electric contact mounted on the base of said bracket, a resilient member mounted on said spring and carrying a contact normally engaging said stationary contact to close an electric circuit, said resiliently mounted contact remaining in circuit-closing position until the spring snaps into reverse curvature at predetermined high temperature, whereupon the circuit is abruptly broken, the buckling of said spring by said thermostat bar at predetermined low temperature abruptly closing the circuit.

6. An electric thermostat comprising a U-shaped supporting bracket, a buckling spring mounted on the arms of said bracket, a U-shaped thermostat bar secured at one end to the base of said bracket, means for rigidly connecting the free end of said bar to said spring, so that the movements of said bar under predetermined changes of temperature snap said spring into reverse curvature, said spring being adapted to prevent thermostatic movement of said bar until predetermined high and low temperature limits are reached, a pair of insulated stationary contacts mounted on the base of said bracket and adapted to be connected in circuit, a resilient plate attached to the center of said spring and carrying a pair of contacts normally engaging said stationary contacts to close an electric circuit, said resiliently mounted contacts remaining in circuit-closing position until the spring snaps into reverse curvature at predetermined high temperature, whereupon the circuit is abruptly broken at two points in series, the buckling of said spring by said thermostat bar at predetermined low temperature abruptly closing the circuit.

7. An electric thermostat comprising a U-shaped supporting bracket, a buckling spring mounted at its ends on the arms of said bracket, a U-shaped thermostat bar secured at one end to the base of said bracket and extending in a direction substantially at right angles to the bracket, a pair of bolts or rivets passing through said bracket and bar for securing these parts together, a pair of insulated contacts carried by said bolts or rivets and adapted to be connected in circuit, a pair of transversely arranged fastening members for connecting the free end of said thermostat bar to the center of said spring, so that the movements of said bar under predetermined changes of temperature snap said spring into reverse curvature, a resilient plate secured to said spring by said fastening members, and contacts carried by said plate for normally engaging said stationary contacts to close the circuit, said resiliently mounted contacts remaining in circuit-closing position until the spring snaps into reverse curvature at predetermined high temperature, whereupon the circuit is abruptly broken at two points in series, the buckling of said spring by said thermostat bar at predetermined low temperature abruptly closing the circuit.

8. In a thermostat, the combination of a U-shaped bracket, a buckling spring mounted at its ends on the arms of said bracket, a U-shaped thermostat bar secured at one end to the base of said bracket and extending in a direction substantially at right angles to said bracket and spring, said thermostat bar being capable of assuming either one of two extreme stable positions in response to predetermined thermal conditions, and means for securing the other end of said bar to the center of said spring.

9. An electric thermostat comprising a U-shaped bracket, a buckling spring mounted on said bracket, a pair of insulated contacts carried by said bracket, a contact plate secured to the center of said spring and normally in pressure engagement with said stationary contacts to close an electric circuit, and a thermostat bar rigidly connected to the center of said spring to buckle it at predetermined high and low temperature limits, whereby said contact plate is abruptly carried by said spring and bar out of and into engagement with said stationary contacts.

10. An electric thermostat comprising a U-shaped bracket, a buckling spring mounted at its ends on the arms of said bracket, a U-shaped thermostat bar secured at one end to the base of said bracket by a pair of insulated bolts which also act as electric contacts, means for rigidly connecting the other end of said bar to the center of said spring, and a resilient plate carried by said spring for normally engaging said contact bolts to close the circuit, said spring being adapted to prevent thermostatic movement of said bar until predetermined high and low temperature limits are reached, whereupon the bar snaps the spring into reverse curvature for abruptly opening and closing the circuit.

STANLEY D. LIVINGSTON.